US011278943B2

(12) United States Patent
Freim, III et al.

(10) Patent No.: US 11,278,943 B2
(45) Date of Patent: Mar. 22, 2022

(54) COMPOSITIONS AND METHODS FOR REMOVING CHLORINATED HYDROCARBONS

(71) Applicant: REGENESIS BIOREMEDIATION PRODUCTS, San Clemente, CA (US)

(72) Inventors: John Oliver Freim, III, Escondido, CA (US); Katherine Djernes Pappano, Costa Mesa, CA (US)

(73) Assignee: REGENESIS BIOREMEDIATION PRODUCTS, San Clemente, CA (US)

( * ) Notice: Subject to any disclaimer, the term of this patent is extended or adjusted under 35 U.S.C. 154(b) by 44 days.

(21) Appl. No.: 16/052,004

(22) Filed: Aug. 1, 2018

(65) Prior Publication Data
US 2020/0038926 A1 Feb. 6, 2020

(51) Int. Cl.
| | | |
|---|---|---|
| B09C 1/08 | (2006.01) |
| C02F 1/467 | (2006.01) |
| C02F 1/28 | (2006.01) |
| C02F 3/28 | (2006.01) |
| C02F 3/34 | (2006.01) |
| B09C 1/10 | (2006.01) |
| B09C 1/00 | (2006.01) |
| C02F 101/36 | (2006.01) |
| C02F 103/06 | (2006.01) |

(52) U.S. Cl.
CPC .............. B09C 1/08 (2013.01); B09C 1/002 (2013.01); B09C 1/10 (2013.01); C02F 1/283 (2013.01); C02F 1/4676 (2013.01); C02F 3/28 (2013.01); C02F 3/34 (2013.01); B09C 2101/00 (2013.01); C02F 2101/36 (2013.01); C02F 2103/06 (2013.01)

(58) Field of Classification Search
None
See application file for complete search history.

(56) References Cited

U.S. PATENT DOCUMENTS

| | | |
|---|---|---|
| 2,509,777 A | 5/1950 | McMillan et al. |
| 3,286,475 A | 11/1966 | Adams |
| 3,785,852 A | 1/1974 | Schleidt |
| 4,033,894 A | 7/1977 | McLaughlin et al. |
| 4,168,924 A | 9/1979 | Draper et al. |
| 4,211,822 A | 7/1980 | Kurfman et al. |
| 4,504,528 A | 3/1985 | Zucker et al. |
| 4,664,809 A | 5/1987 | Fenton et al. |
| 5,006,250 A | 4/1991 | Roberts et al. |
| 5,217,616 A | 6/1993 | Sanyal et al. |
| 5,266,213 A | 11/1993 | Gillham |
| 5,395,419 A | 3/1995 | Farone et al. |
| 5,514,279 A | 5/1996 | Blowes et al. |
| 5,580,770 A | 12/1996 | DeFilippi |
| 5,591,118 A | 1/1997 | Bierck |
| 6,592,294 B1 | 7/2003 | Moore |
| 6,596,190 B1 | 7/2003 | Igawa et al. |
| 6,806,078 B2 | 10/2004 | Newman |
| 7,101,115 B2 | 9/2006 | Luthy et al. |
| 7,160,471 B2 | 1/2007 | Looney et al. |
| 7,395,863 B2 | 7/2008 | Wang et al. |
| 7,585,132 B2 | 9/2009 | Imbrie |
| 7,845,883 B1 | 12/2010 | Siler, III et al. |
| 7,963,720 B2 | 6/2011 | Hoag et al. |
| 7,985,460 B2 | 7/2011 | Polk |
| 8,748,331 B2 | 6/2014 | Talley et al. |
| 8,986,545 B2 | 3/2015 | Kolhatkar |
| 2003/0047507 A1 | 3/2003 | Hou et al. |
| 2004/0031223 A1 | 2/2004 | Durning et al. |
| 2004/0195182 A1 | 10/2004 | Elliott |
| 2004/0249025 A1 | 12/2004 | Dean |
| 2005/0263460 A1 | 12/2005 | Farone et al. |
| 2005/0282390 A1 | 12/2005 | Bian et al. |
| 2006/0054570 A1 | 3/2006 | Block et al. |
| 2006/0088498 A1 | 4/2006 | Martin et al. |
| 2006/0196850 A1 | 9/2006 | Roh et al. |
| 2007/0297858 A1 | 12/2007 | Imbrie |
| 2008/0008535 A1 | 1/2008 | Ball |
| 2008/0125334 A1 | 5/2008 | Burns et al. |
| 2008/0176943 A1 | 7/2008 | Kaiser et al. |
| 2009/0197042 A1 | 8/2009 | Polk |

(Continued)

FOREIGN PATENT DOCUMENTS

| | | |
|---|---|---|
| CN | 106396074 | 2/2017 |
| CN | 106396074 B | * 10/2019 |
| WO | 9849106 | 11/1998 |
| WO | WO2015123569 | 8/2015 |

OTHER PUBLICATIONS

Ben Mussa, Samira A; et al; "Determination of Available Nitrate, Phosphate and Sulfate in Soil Samples" International Journal of PharmTech Research, 1, 598-604, 2009 (Year: 2009).*

Zhou, Ya-Zhen; et al.; "Bio-beads with immobilized anaerobic bacteria, zero-valent iron, and active carbon for the removal of trichloroethane from groundwater" Environmental Science Pollution Research, 21, 11500-11509, 2014 (Year: 2014).*

Copenheaver, Blaine R.; International Search Report; PCT/US2019/043507; dated Oct. 17, 2019; 7 pages.

MacKenzie et al., "Carbo-Iron an Fe/AC composite as alternative to nano-iron for groundwater treatment", Water Res.; Aug. 2012, vol. 46 (12); pp. 3817-3826; (retrieved from Internet: (http:www///.sciencedirect.com/science/article/pii/S0043135412002552#), pp. 38'9, col. 2. para 2; p. 3820, col. 1, para 4; p. 3822, col. 2, para 2-3; abstract.

(Continued)

Primary Examiner — David W Berke-Schlessel
(74) Attorney, Agent, or Firm — Stetina Brunda Garred & Brucker

(57) ABSTRACT

Compositions and methods for soil and groundwater remediation are contemplated as comprising a zero valent metal having a metal sulfide surface layer and an organic compound operative to degrade to produce molecular hydrogen. Such compositions may also include particulate activate carbon and anaerobic bacteria operative to perform reductive dechlorination. These compositions synergistically operate to remove chlorinated hydrocarbons from contaminated soil and groundwater.

9 Claims, No Drawings

(56) References Cited

U.S. PATENT DOCUMENTS

| | | | |
|---|---|---|---|
| 2012/0056127 | A1 | 3/2012 | Baseeth et al. |
| 2013/0058724 | A1 | 3/2013 | John et al. |
| 2015/0034559 | A1 | 2/2015 | Mork et al. |
| 2015/0329390 | A1 | 11/2015 | Borden |

OTHER PUBLICATIONS

Committee on Future Options for Management in the Nation's Subsurface Remediation Effort et al.; Prepublication Alternatives for Managing the Nation's Complex Contaminated Groundwater Sites; 2012; 339 pages; National Academy of Sciences; The National Academies Press; Washington, D C.; US.
Young, Lee W.; International Search Report; PCT/US 15/15899; dated Jan. 15, 2015; 8 pages.
Young, Lee W.; International Search Report; PCT/US 14/494,468; dated Aug. 2, 2013; 9 pages.
Copenheaver, Blaine R.; International Search Report; PCT/US2011/058388; dated Feb. 17, 2012; 6 pages.
Young, Lee W.; International Search Report; PCT/US 18/32145 ; dated Aug. 1, 2018; 10 pages.
Young, Lee W.; International Search Report; PCT/US 18/32392 ; dated Aug. 7, 2018; 10 pages.
Thomas, Shane; International Search Report; PCT/US17/22795; dated Jun. 9, 2017; 15 pages.
Copenheaver, Blaine R.; International Search Report; PCT/US2017/037242; dated Aug. 7, 2017; 13 pages.

\* cited by examiner

COMPOSITIONS AND METHODS FOR REMOVING CHLORINATED HYDROCARBONS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to the field of the combined use of chemical reactions and biological processes to promote elimination of toxic chemicals from soil and groundwater. More particularly, the present disclosure relates to the use of chemical reductants containing a zero valent metal core with a metal sulfide surface to promote chemical and biological processes to remove toxic chemicals from soil and groundwater.

2. Related Art

Chlorinated hydrocarbons are frequently introduced into soil and groundwater through the improper release and disposal of chemicals used in dry cleaning, degreasing and other industries. Many of these chemicals are toxic even in small concentrations, and because natural degradation is usually slow, active groundwater remediation is often required to prevent such toxic chemicals from being introduced into drinking water or otherwise causing harm.

Excavation and other physical methods are commonly used to remove toxic chemicals from contaminated soil and groundwater. These methods have limitations, however, and are insufficient when the contaminants are deep or located under buildings or infrastructure. Other techniques that are used to remove contaminants from groundwater are "pump-and-treat" methods where contaminated groundwater is pumped out of the ground the contaminants are removed using adsorbents, chemical, or biological methods. Pump-and-treat technologies are expensive to implement and maintain, and can be perceived as a never-ending process in part due to back-diffusion of contaminants from clays and other sinks moving into more transmissive aquifer zones.

The complications associated with physical remediation technologies can be overcome by using in-situ remediation methods where organic and inorganic materials are pumped into the ground and the contaminants are eliminated within the aquifer itself. Chlorinated hydrocarbons can sometimes be eliminated using chemical oxidants or bacteria that operate in an aerobic environment but often, these contaminants are more efficiently treated in an oxygen-free anaerobic environment.

One method for eliminating chlorinated hydrocarbons involves adding zero valent metals, often zero valent iron, into the contaminated groundwater. Metals serve as an electrochemical reductant and can react with and convert trichloroethylene and similar compounds into ethene and other innocuous substances. These reactions are relatively fast and when reacting with trichloroethylene and chlorinated ethenes the degradation pathway can bypass the formation of partially dechlorinated and toxic intermediaries such as vinyl chloride.

Zero valent metals also react with water to produce molecular hydrogen and metal hydroxides as reaction products. This reaction is undesirable because the electrons supplied by the oxidation of the metal are not available to react with the groundwater contaminants and convert them to innocuous substances. This reaction is also undesirable because the surface of the zero valent metal particles can become passivated, allowing metal hydroxides to form on the zero valent metal surfaces. This passive layer can limit the reactivity of, or passivate, the zero valent metals. Another shortcoming of using zero valent metals to eliminate chlorinated hydrocarbons is that some compounds such as 1,2-dichloroethane and dichloromethane exhibit limited or no reactivity with zero valent metals.

Another method for eliminating chlorinated hydrocarbons involves adding organic compounds into contaminated groundwater where the organic compounds degrade and provide molecular hydrogen to support the metabolism of anaerobic bacteria that are involved in anaerobic bioremediation. These bacteria are anaerobes are will not function if an electrochemically reducing and oxygen-free environment cannot be established and maintained. Special strains of these anaerobic bacteria have the unique capability to convert some chlorinated hydrocarbons to innocuous compounds. In an appropriate environment, this process can accomplish the in-situ remediation of many common chlorinated hydrocarbons. Nutrients are often added to further support the metabolism of the anaerobic microbes.

However, anaerobic bioremediation has limitations that can include long remediation timeframes and the formation of partially dechlorinated daughter products that can be as toxic as the parent compound. Also, some chlorinated compounds are toxic to and can inhibit the performance of the anaerobic microbes that facilitate bioremediation.

Another method for eliminating chlorinated hydrocarbons involves adding activated carbon and other adsorbents into contaminated groundwater. Remediation is accomplished by adsorbing contaminants out of the dissolved phase and onto the activated carbon surfaces and within the activated carbon pores. Carbon adsorbents can also concentrate chlorinated contaminants onto their surfaces, producing an environment that is more favorable for bioremediation.

In many circumstances it is advantageous to use a combination of one or more products or approaches to accomplish the in-situ remediation of contaminated groundwater. An example is combining and co-applying zero valent metals and organic compounds. The zero valent metals directly react with and eliminate many chlorinated hydrocarbons while also reacting with and removing dissolved oxygen in groundwater, rendering a better environment for anaerobic biodegradation. Zero valent metals can also reduce concentrations of some organic compounds such as 1,1,1-trichloroethane that can inhibit anaerobic biodegradation.

Similarly, applying a combination of activated carbon and an organic compound can accelerate the anaerobic bioremediation of chlorinated compounds. Perchloroethylene and other dissolved phase contaminants partition out of the aqueous phase and adsorb onto the activated carbon particle surfaces, thereby removing mobile contaminants from the immediate risk pathway. Concentration of the contaminants in this manner, in a matrix conducive to bacteria colonization and activity, results in a direct increase in the rate of contaminant destruction by the bacteria whose metabolism are supported by the molecular hydrogen supplied by the degradation of the organic compound. Activated carbon also has a strong affinity for dissolved oxygen and can help provide the anoxic environment that promotes effective bioremediation.

The advantage of using a combination of two or more remediation approaches has been recognized. For example, U.S. Pat. No. 6,265,205 by Hitchens et al. described a method where bimetallic metal (magnesium and iron) is co-applied with fermentable organic compounds to promote the degradation of chlorinated hydrocarbons. The magnesium is included on the particle surface as a sacrificial anode to inhibit the undesired reaction of the zero-valent iron reductant with water. Hitchens acknowledge that the inhibition is short-lived because magnesium also reacts with water. U.S. Pat. No. 8,147,694 by Scalzi et al. describe a method where unmodified zero valent metal was co-applied with fermentable organic compounds and other amendments to address chlorinated hydrocarbon contaminated groundwater.

The previously described bare metal and bimetallic metal products share the same disadvantage wherein the zero valent metal reacts with water to produce molecular hydrogen and hydroxides. This reaction has inherent disadvantages including the unwanted reaction of the metal with water instead of the groundwater contaminant. Additionally, the metal hydroxide species such as iron hydroxide have limited aqueous phase solubility. The metal hydroxide layer that will be formed on the particle surface ultimately exhibits lesser reactivity than the zero valent metal, resulting in particle surface becoming passivated.

Therefore, there is a need in the art for improved zero-valent metal remediation systems which do not suffer from the above described deficiencies.

BRIEF SUMMARY

To solve these and other problems, zero-valent metal systems that do not react with water to produce molecular hydrogen and hydroxides are contemplated. These systems may be formulated by combining a zero valent metal core and a metal sulfide surface layer in combination with an organic compound operative to degrade to produce molecular hydrogen, as well as other components such as particulate activated carbon and an anaerobic bacteria operative to perform reductive dechlorination. Unlike earlier short lived bimetallic systems, the presently contemplated systems have the potential for extended activity, due to sulfate being a naturally abundant groundwater constituent that can be readily electrochemically converted to sulfide either via chemical reaction or biologically via sulfate reducing bacteria. In the presence of iron constituents, sulfate in groundwater will also electrochemically convert to iron sulfate. This advantageous metal core/metal sulfide shell particle configuration will prevent the undesirable reaction of the metal with water and preserve the zero valent metal for direct chemical reaction with groundwater contaminants for extended periods of time.

In a preferred embodiment, such compositions may be formulated as aqueous colloid. In such aqueous colloids, the particulate activated carbon may be present in an amount ranging from 0.01% to 70.0% by weight, and in more preferred embodiments, in an amount ranging from 0.01% to 20.0% by weight. The particulate activated carbon particles may have a particle size ranging from 0.1 to 10 microns. The weight percentage in the zero valent metal of the metal sulfide surface layer may be from 0.1% to 30%.

In the preferred embodiment, the zero valent metal is iron, the anaerobic bacteria operative to perform reductive dechlorination comprises one or more strain selected from the group comprising: dehalococcoides ethenogenes, dehalobacter, dehalogenimonas, and the organic compound operative to degrade to produce molecular hydrogen comprises one or more of: sodium lactate, glycerol, vegetable oil, molasses, ethanol, poly(lactic acid).

Methods for using such compositions to remediate soil and groundwater are also contemplated, such methods comprising providing a composition comprising a zero valent metal having a metal sulfide surface layer, particulate activated carbon, an anaerobic bacteria operative to perform reductive dechlorination, and an organic compound operative to degrade to produce molecular hydrogen, and applying the composition to soil and groundwater.

DETAILED DESCRIPTION

According to various aspects of the present disclosure, new compositions for use in soil and groundwater remediation, as well as method of using such compositions, are contemplated. In an exemplary embodiment, a composition may comprise an aqueous colloidal biometric formed from a zero valent metal having a metal sulfide surface layer, particulated activated carbon, an anaerobic bacteria operative to perform reductive dechlorination, and an organic compound operative to degrade to produce molecular hydrogen.

When added to contaminated soil and groundwater, zero valent metals are powerful electrochemical reductants can directly react with and eliminate many toxic chlorinated hydrocarbons. The chemical reaction of tetrachloroethylene and zero valent iron to produce innocuous ethene is as follows:

$$C_2Cl_4 + 4Fe^0 + 4H_2O \rightarrow C_2H_4 + 4Fe^{+2} + 4OH^- + 4Cl^-$$

A competing reaction that occurs in groundwater is the reaction of zero valent metal with water. The chemical reaction of zero valent metal with water is as follows:

$$2Fe^0 + 2H_2O \rightarrow 2Fe^{+2} + H_2 + 2OH^-$$

Iron hydroxide has limited solubility, which permits the ferrous iron and hydroxide to combine to produce solid iron(II)hydroxide, iron(III)hydroxide and oxyhydroxides, as shown by the following chemical reaction:

$$Fe^{+2} + 2OH^- \rightarrow Fe(OH)_2$$

The resulting iron hydroxide only has limited reactivity with chlorinated hydrocarbons, and if deposited onto the metal particle surface, results in passivation of that metal, further minimizing reactivity with the chlorinated hydrocarbons When zero valent metals are added to contaminated groundwater, more than 90% of the metal reacts with water to produce molecular hydrogen and hydroxide instead of the desired reaction with the chlorinated hydrocarbons. To prevent the undesired reaction of zero valent metals with water, it has been found that formation of a metal sulfide surface layer (typically iron sulfide) may act to limit the production of molecular hydrogen via the competing reaction of zero valent metals with water may be substantially limited. Additionally, metal particles with this sulfidated shell configuration also exhibit greatly accelerated reactivity with chlorinated ethenes, including tetrachloroethylene and trichloroethylene. This may result in faster and more complete groundwater remediation compared to bare iron alone.

When added to contaminated soil and groundwater, special strains of anaerobic bacteria are uniquely capable of consuming chlorinated hydrocarbons and converting them to innocuous substances. These include, without limitation, dehalococcoides ethenogenes that consume chlorinated ethenes, dehalobacter that consume chlorinated ethenes, and dehalogenimonas that consumes chlorinated propanes. As anaerobic strains, these bacteria use molecular hydrogen as an electron donor to provide energy and support their metabolism. Because sulfidated zero valent metals (compared to bare zero valent metals) do may not produce substantial amounts of molecular hydrogen when added to water, the molecular hydrogen required to support bioremediation must come from another source.

It may be seen that when added to contaminated soil and groundwater, many organic compounds are operative to degrade so as to produce molecular hydrogen, which may be then be used to support the metabolism of bacteria that accomplish reductive dechlorination. Examples of organic compounds that degrade to produce molecular hydrogen include, for example but without limitation, sodium lactate, glycerol, vegetable oil, molasses, and ethanol.

When activated carbon is added to contaminated soil and groundwater, many chlorinated hydrocarbons may partition out of the aqueous phase and adsorb onto the activated carbon particle surfaces, thereby removing mobile contaminants from the immediate risk pathway. Concentration of the contaminants in this manner, in a matrix conducive to the colonization and activity of bacteria that accomplish reductive dechlorination, results in a direct increase in the overall instantaneous rate of contaminant destruction by these contaminant-degrading bacteria. The net result is a substantial increase in the rate and extent of contaminant destruction. Enhanced biodegradation of contaminants within the biomatrix also more rapidly regenerates or frees up sorption sites, allowing contaminants to further partition out of the groundwater. This allows a single application of a bioremediation product to remain functional for an extended timeframe. Activated carbon can also adsorb dissolved oxygen from groundwater, promoting a better environment for anaerobic bioremediation.

It may thus be seen that by combining a zero valent sulfidated metal with activated carbon, an anaerobic bacteria operative to perform reductive dechlorination, and an organic compound operative to degrade to produce molecular hydrogen, a composition may be formed which synergistically operates to remediate soil and groundwater. This composition may be in certain embodiments, a colloidal biomatrix, which is a collection of sorbent particles that supports bacterial growth and adsorption of contaminants from soil and groundwater.

This combination provides synergistic advantages that cannot be accomplished when using existing remediation approaches. The benefits of these exemplary compositions were tested in a laboratory study. Three 25 mm diameter, 500 mm length columns were dry packed with medium-fine sand (200-500 μm), purged with carbon dioxide for 15 minutes, and filled with deoxygenated tap water. A sterile control column was prepared by flushing one pore volume (90 mL) of 200 mg/L sodium azide solution. A biological only column was prepared by flowing one pore volume of deoxygenated lactate/nutrient/dechlorinating bacteria solution (1000 mg/L sodium lactate, 10 mg/L nutrients) into the column. An experimental column was prepared by adding one pore volume (90 mL) of a dilute suspension of sulfidated iron (1% iron or 10 mg/L) mixed with a dilute suspension of colloidal activated carbon (0.02% as carbon or 0.2 mg/L), and then flushed with deoxygenated tap water until the effluent appeared clear. The solution of the biological only column was then flowed through the experimental column.

Trichloroethylene (TCE) was continuously flowed through all three columns as a 2 mg/L solution at a rate of one pore volume per week for ten weeks. The influent for the control column contained trichloroethylene as well as 200 mg/L sodium azide solution. The influent for the biological and experimental columns contained TCE as well as 100 mg/L lactate and 1 mg/L nutrients. Effluent samples from each column were collected weekly and analyzed by GC-MS for their trichloroethylene, cis-1,2-dichloroethylene, and vinyl chloride concentrations.

The concentration of TCE in the sterile column trended upward and peaked at about 20 uM (2.6 mg/L) at nine weeks. In the biological column TCE concentration peaked at about 5 uM at five weeks. In the experimental column, TCE was no detected in any sampling period. The biological column showed the conversion of TCE to cis-1,2-dichloroethylene and vinyl chloride, with cis-1,2-dichloroethylene peaking at about 12 μM at week seven, with about 6 uM still present at week ten. Vinyl chloride peaked at about 6 uM at week five and about 5 uM was still present at week ten. Daughter products were removed much more quickly and completely in the experimental column. Cis-1.2-dichloroethylene peaked at about 4 uM at week three and was not detected after week 6. Vinyl chloride peaked at about 11 uM at week five and was not detected after week 8.

As experimentally demonstrated, the combination of the sulfidated zero valent metal, activated carbon, an anaerobic bacteria operative to perform reductive dechlorination, and organic compounds operate to degrade to hydrogen provides a favorable environment for both chemical and biological elimination of chlorinated hydrocarbons. Importantly, using sulfidated metal overcomes fundamental deficiencies of zero valence metals, which is the unwanted reaction of bare metal with water. The addition of the degradable organic compounds also solves the problem that arises in combining dechlorinating bacteria with sulfidated zero valent metals, as otherwise there would be a lack of molecular hydrogen for use by the dechlorinating bacteria, because very little or no molecular hydrogen is produced by the competing reaction of zero valent metals with water.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A method for removing chlorinated hydrocarbons from soil and groundwater containing an amount of naturally occurring sulfate ions, the method comprising the steps of:
   a) providing a composition comprising a plurality of particles having a zero valent metal interior and a metal sulfide outer surface layer, activated carbon, and an organic compound operative to degrade to produce molecular hydrogen; and
   b) applying the composition to soil and groundwater in need of remediation such that said naturally occurring sulfate ions and said metal sulfide outer surface layer are operative to limit said zero valent metal interior from reacting with water;
   wherein following application of the composition in step b, said zero valent metal interior electrochemically reduces said chlorinated hydrocarbons predominantly via direct chemical reaction therewith; and wherein the limiting of said zero valent metal interior from reacting with water operates to accelerate the electrochemical reduction of chlorinated hydrocarbons by direct reaction with the zero valent metal interior via reducing undesired reaction of the zero valent metal interior with water and via reducing production of metal hydroxide reaction products resulting from the reaction of zero valent metal interior with water.

2. The method of claim 1, wherein the composition is formulated as an aqueous colloid.

3. The method of claim 1, wherein the activated carbon comprises a particulate activated carbon.

4. The method of claim 1, wherein the composition further comprises an anaerobic bacteria operative to perform reductive dechlorination.

5. The method of claim 4, wherein the anaerobic bacteria operative to perform reductive dechlorination comprises one or more strain selected from the group comprising: Dehalococcoides ethenogenes, Dehalobacter, Dehalogenimonas.

6. The method of claim 1, wherein the zero valent metal comprises iron.

7. The method of claim 1, wherein the metal sulfide outer surface layer comprises iron sulfide.

8. The method of claim 1, wherein in the zero valent metal, the weight percentage of the metal sulfide surface layer is from 0.1% to 30%.

9. The method of claim 1, wherein the organic compound operative to degrade to produce molecular hydrogen comprises one or more of: sodium lactate, glycerol, vegetable oil, solid vegetable matter, molasses, ethanol, poly(lactic acid), and carbohydrate.

* * * * *